United States Patent
Rinn

(10) Patent No.: US 6,924,900 B2
(45) Date of Patent: Aug. 2, 2005

(54) METHOD AND MICROSCOPE FOR DETECTION OF A SPECIMEN

(75) Inventor: Klaus Rinn, Heuchelheim (DE)

(73) Assignee: Leica Microsystems Semiconductor GmbH, Wetzlar (DE)

( * ) Notice: Subject to any disclaimer, the term of this patent is extended or adjusted under 35 U.S.C. 154(b) by 0 days.

(21) Appl. No.: 10/187,431

(22) Filed: Jul. 2, 2002

(65) Prior Publication Data

US 2003/0025992 A1 Feb. 6, 2003

(30) Foreign Application Priority Data

Jul. 2, 2001 (DE) .......................................... 101 31 508

(51) Int. Cl.$^7$ .......................... G01B 11/14; G01B 11/04
(52) U.S. Cl. ........................ 356/614; 356/625; 356/636; 250/559.36
(58) Field of Search ................................ 356/601, 614, 356/622, 624, 625–640; 250/559.29, 559.36; 359/370, 368, 379–382, 655; 382/133, 172, 284, 286, 308; 707/102, 104; 348/50

(56) References Cited

U.S. PATENT DOCUMENTS

| | | | |
|---|---|---|---|
| 4,175,860 A | * 11/1979 | Bacus | 356/39 |
| 4,674,883 A | * 6/1987 | Baurschmidt | 356/630 |
| 5,400,176 A | * 3/1995 | Dreessen et al. | 359/385 |
| 6,031,661 A | 2/2000 | Tanaami | |
| 6,054,710 A | * 4/2000 | Bruggeman | 250/307 |
| 6,151,127 A | 11/2000 | Kempe | |
| 6,263,233 B1 | * 7/2001 | Zavislan et al. | 600/476 |
| 6,272,235 B1 | * 8/2001 | Bacus et al. | 382/133 |
| 6,323,953 B1 | * 11/2001 | Blaesing-Bangert et al. | 356/614 |
| 6,664,528 B1 | * 12/2003 | Cartlidge et al. | 250/208.1 |
| 2002/0057839 A1 | * 5/2002 | Rinn et al. | 382/199 |
| 2002/0154317 A1 | * 10/2002 | Kempe | 356/484 |
| 2002/0196331 A1 | * 12/2002 | Rinn | 348/50 |

FOREIGN PATENT DOCUMENTS

| | | |
|---|---|---|
| DE | 198 19 492 A1 | 11/1999 |
| EP | 0 819 964 B1 | 1/1998 |
| JP | 02003066337 A * | 3/2003 |
| WO | WO 96/37797 | 11/1996 |

* cited by examiner

Primary Examiner—Hao Q. Pham
(74) Attorney, Agent, or Firm—Crowell & Moring LLP

(57) ABSTRACT

The present invention concerns a method and a microscope for detection of a specimen, having a light source that illuminates the specimen and an imaging system that images the specimen onto a detector. For purposes of an increase in the effective resolution capability of the imaging system that goes beyond the limit of the resolution capability defined by the properties of the imaging system, the method and the microscope according to the present invention for detection of a specimen are characterized in that the specimen is detected repeatedly with a different resolution of the imaging system in each case; and that in order to determine an optimized resolution capability, the detected image data are conveyed to a statistical and/or numerical analysis operation.

23 Claims, 3 Drawing Sheets

METHOD AND MICROSCOPE FOR DETECTION OF A SPECIMEN

CROSS REFERENCE TO RELATED APPLICATIONS

This application claims priority of the German patent application 101 31 508.2 which is incorporated by reference herein.

FIELD OF THE INVENTION

The present invention concerns a method and a microscope for detection of a specimen, having a light source that illuminates the specimen and an imaging system that images the specimen onto a detector.

BACKGROUND OF THE INVENTION

Methods and, in particular, microscopes of the species have been known from practical use for some time. In industrial applications, for example in the metrology of line widths or positions on substrates of the semiconductor industry, coordinate measuring instruments such as those described, for example, in German Patent Application DE 198 19 492.7-52 are used. FIG. 3 is a diagram of the measuring instrument in DE 198 19 492.7-52. This measuring instrument serves for highly accurate measurement of the coordinates of features on substrates 8, e.g. masks, wafers, flat screens, and evaporatively deposited features, but in particular for transparent substrates. The coordinates are determined relative to a reference point, to an accuracy of a few nanometers.

In the metrology of line widths or positions on substrates of the semiconductor industry, the detected images are digitally processed in order to extract characteristic measurement parameters. For that purpose, a specimen to be measured—usually a wafer or an exposure mask 8 for manufacturing a wafer—is illuminated with light 13 at a wavelength of 365 nm. The specimen illuminated in this fashion is imaged with an objective of the microscope onto a detector 14, the detector usually being embodied as a CCD camera.

The achievable resolution capability of such an imaging system 10 depends essentially on the light wavelength used and on the numerical aperture of the objective. To increase the resolution capability of the imaging system, the numerical aperture must therefore be increased; there is almost no further possibility for this with present-day microscope objectives, however, since the limits of what is feasible in terms of optics and precision mechanics have largely been reached. The use of short light wavelengths requires the utilization of special optics and optical components, so that here again it is not possible to use light of an arbitrarily short wavelength.

SUMMARY OF THE INVENTION

It is therefore the object of the present invention to describe and further develop a method and a microscope of the species for detection of a specimen, which make possible an increase in the effective resolution capability of the imaging system that goes beyond the limits of the resolution capability defined by the properties of the imaging system.

The method of the species according to the present invention achieves the aforesaid object by way of the features of illuminating the specimen; imaging the specimen onto a detector; detecting repeatedly the specimen with a different resolution of the imagining system in each case, thereby producing image data in each case; and conveying the detected image data to a statistical and/or numerical analysis operation. According to the latter, a method of this kind is characterized in that the specimen is detected repeatedly with a different resolution of the imaging system in each case; and that in order to achieve an optimized resolution capability, the detected image data are conveyed to a statistical and/or numerical analysis operation.

What has been recognized according to the present invention is firstly that it is very difficult to improve the optical resolution of an imaging system. The maximum resolution capability of an imaging system can, however, be relatively easily degraded, for example by reducing the numerical aperture of the imaging system using a corresponding aperture stop arranged in the beam path. According to the present invention, the specimen to be imaged is detected repeatedly with a different resolution of the imaging system in each case, so that image data of differing resolutions are present for the same specimen. These detected image data are then conveyed to a statistical and/or numerical analysis operation. The result of the statistical and/or numerical analysis operation can be an image, a characteristic parameter, or a measured value of the specimen at a resolution capability of the imaging system that cannot be set or that was not set during the detections. Provision could furthermore be made for the result of the statistical and/or numerical analysis operation to be a statement as to the resolution capability of the imaging system at which the previously imaged specimen may be optimally imaged, for example in order to image other specimens of comparable type at that optimized resolution capability.

The resolution capability of the imaging system could be modified by varying the wavelength of the illuminating light. In microscopes in particular, light of different wavelengths with which the specimen is illuminated during the individual specimen detections could be selected, with the aid of suitable color filters, from the spectrum of a mercury vapor lamp serving to illuminate the specimen. In addition, multiple light sources that emit light of differing wavelengths could be provided for specimen illumination. The resolution capability of the imaging system changes in accordance with the particular wavelength of the illuminating light that is coupled in. A simultaneous coupling in of light of different wavelengths, in combination with a simultaneous detection of the specimen, could also represent multiple specimen detections with a different resolution of the imaging system in each case, if multiple detectors simultaneously detect specimen data each for light of one wavelength. In this context, appropriate wavelength-selective beam splitters would need to be provided in the beam path of the imaging system in front of the respective detectors.

Alternatively or additionally, the resolution capability of the imaging system could be varied with at least one means. In the case of a microscope, another microscope objective present in the objective turret could be introduced for this purpose into the imaging beam path, microscope objectives of identical magnification and differing numerical aperture being, for example, arranged in the objective turret. An aperture stop of variable diameter arranged in the beam path of the imaging system could also serve as the means for varying the resolution capability of the imaging system. The repeated specimen detection would thus need to be performed with a different aperture stop diameter in each case.

A modification of the resolution capability of the imaging system could also be achieved by the fact that the resolution of the detected images is degraded with digital image processing methods or numerically. A combination of multiple pixels is conceivable in this context; a lowpass filtration of the images could also be provided for. The image data could moreover be convoluted with two- or three-dimensional functions which describe the imaging of the imaging system at different resolutions in each case, and which were calculated e.g. by means of simulation calculations.

Preferably the specimen is detected repeatedly with the imaging system set at one resolution capability. The image data detected in this fashion could be conveyed to a statistical analysis operation with which, in particular, the noise component or measurement errors of said detected image data can be reduced. In particular, the statistical analysis operation of the image data detected repeatedly with the imaging system set at one selected resolution capability could comprise an averaging operation or another statistical weighting operation.

In very particularly preferred fashion, provision is made for characteristic parameters of the specimen to be extracted from the detected image data. This could involve, for example, the boundary or an area of a feature or of a specimen. In semiconductor inspection in particular, the boundary or boundary profile of a conductor path is of great interest, so that what is to be extracted as a relevant characteristic parameter is the edge of such a conductor path. The intensity profile along a curve through a detected feature or a detected specimen could furthermore be of interest. The intensity profile along a line segment in the detected image is usually extracted as a characteristic parameter. Also of great interest is the localization of a feature or a specimen or a portion thereof; in the metrology of line widths or positions on substrates of the semiconductor industry using coordinate measuring instruments, for example, it is possible to determine the width of a conductor path by determining the location of its two edges.

Extraction of the characteristic parameters is preferably accomplished in the context of the image data that were detected with the resolution capability of the imaging system set differently in each case. In this context, for example, the location of an edge of a conductor path would be extracted from the detected image data at different resolution capabilities in each case, different values then being ascertained, as expected, for the location of the edge.

In order to determine or achieve an optimized resolution capability of the imaging system, provision could advantageously be made for an interpolation or extrapolation of the values of the characteristic parameters to another resolution capability of the imaging system that was not set during detection. The interpolation or extrapolation could also be accomplished on the basis of a function approximated to the values of the characteristic parameters.

The values of the extracted characteristic parameters could be conveyed to a numerical and/or statistical analysis operation as a function of the particular resolution capability of the imaging system set during detection. The purpose of such an analysis operation could be, for example, to discover a function that approximates the values of the characteristic parameters.

It should be particularly emphasized in this context that the purpose of the method according to the present invention is not to render visible features that are invisible at a given optical resolution capability, but rather to reduce or at least to minimize errors in the measurement of characteristic parameters by defining the resolution capability of the imaging system.

The microscope, preferably the coordinate measuring instrument, according to the present invention for detection of a specimen achieves the object recited above by a light source that illuminates the specimen; an imaging system that images the specimen onto a detector, in particular for carrying out the method according to the invention; a detector for detecting the specimen repeatedly with a different resolution of the imaging system in each case; and a calculator for performing statistical and/or numerical analysis operation on the conveyed detected image data. According to the latter, a microscope of this kind for detection of a specimen is characterized in that the specimen can be detected repeatedly with a different resolution of the imaging system in each case; and that to achieve an optimized resolution capability, the detected image data can be conveyed to a statistical and/or numerical analysis operation.

The microscope according to the present invention serves in particular for detection of a specimen in order to carry out a method according to the invention. To eliminate duplication, the reader is referred in that regard to the preceding portion of the Specification.

There are various ways of advantageously embodying and developing the teaching of the present invention. The reader is referred, for that purpose, on the one hand to the invention claimed herein, and on the other hand to the explanation below of the preferred exemplary embodiments of the invention with reference to the drawings. In conjunction with the explanation of the preferred exemplary embodiments of the invention with reference to the drawings, an explanation is also given of generally preferred embodiments and developments of the teaching.

DETAILED DESCRIPTION OF THE INVENTION

Figure 1:
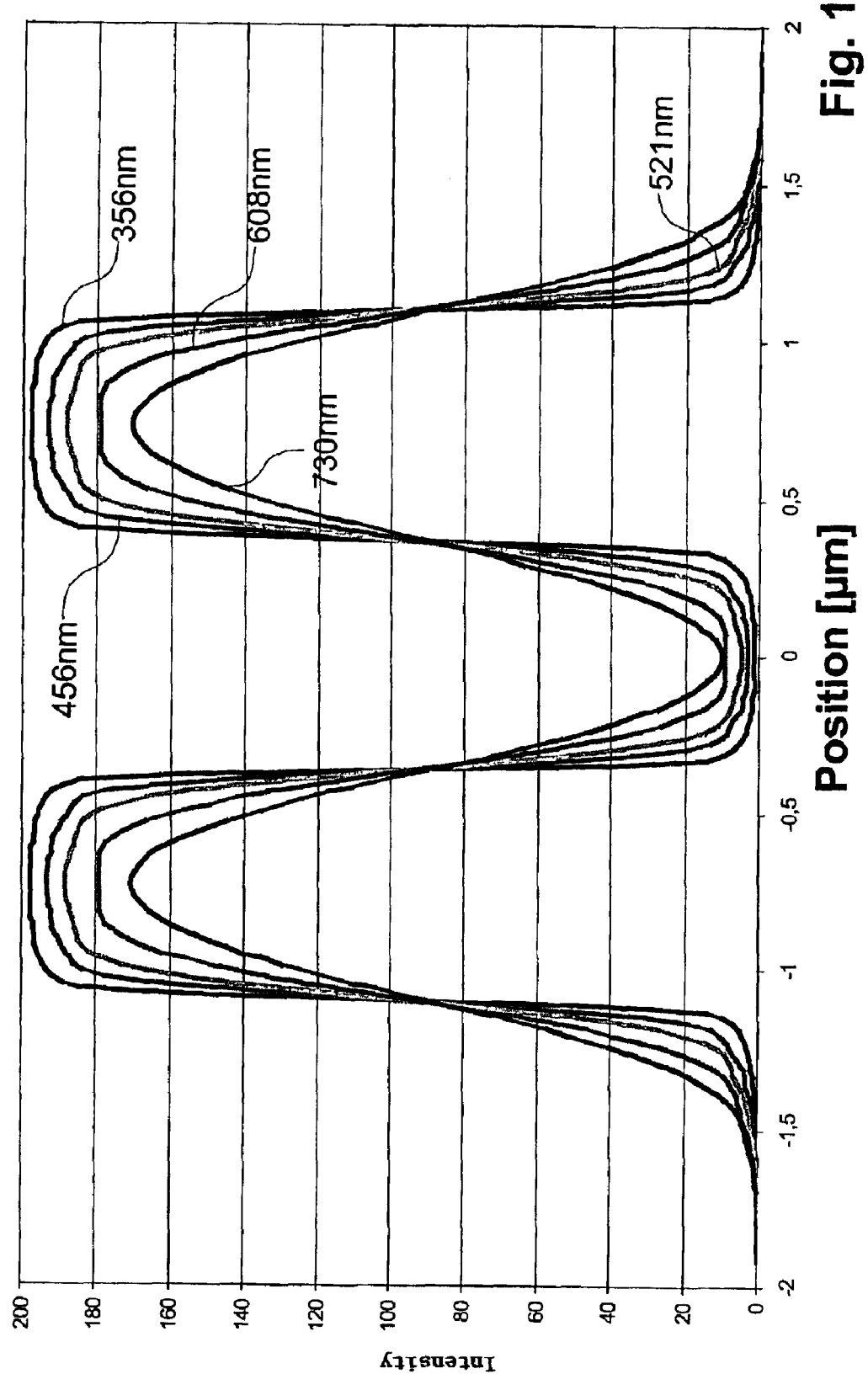
FIG. 1 is a diagram showing measured line profiles at different illumination wavelengths.
Figure 2:
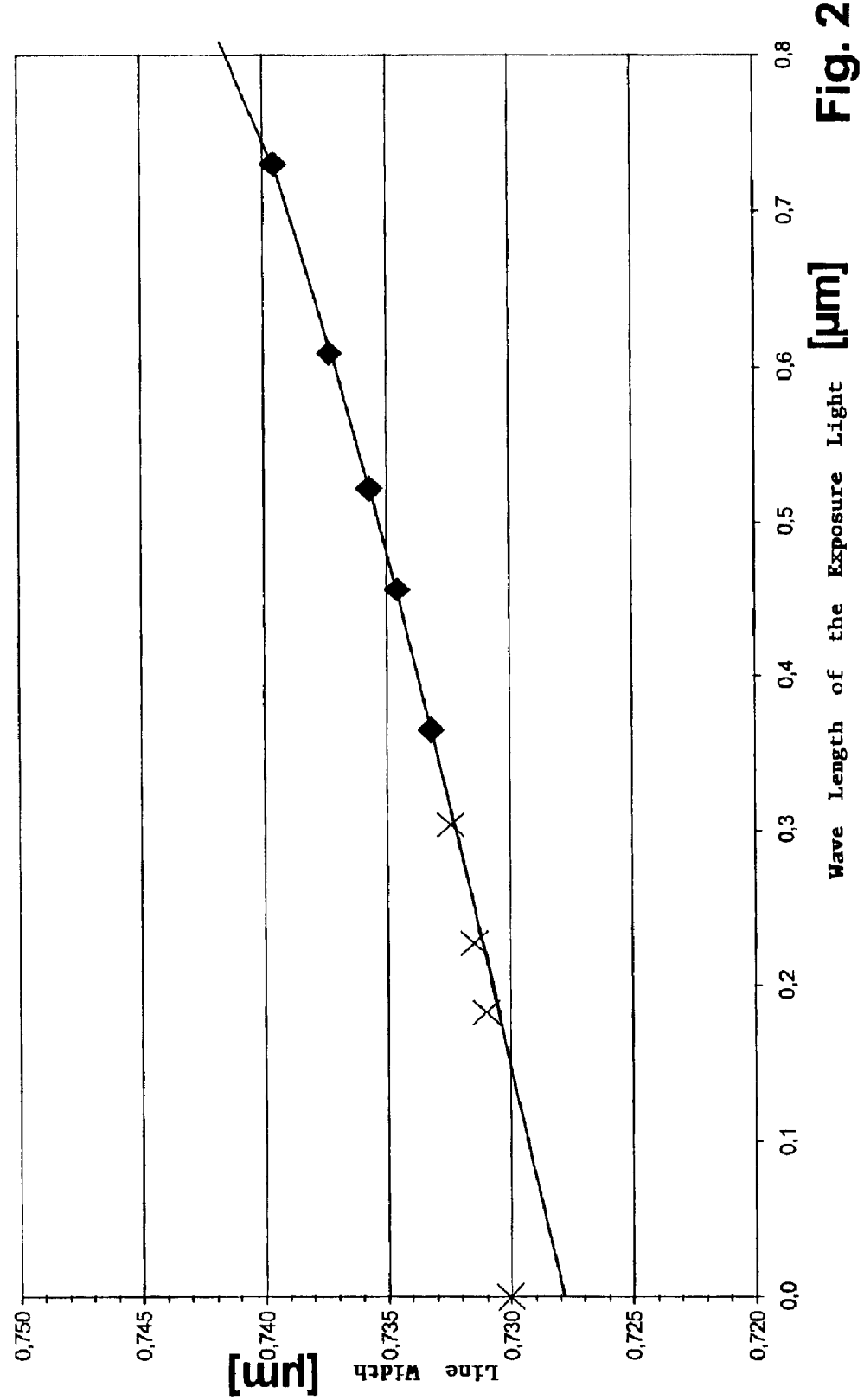
FIG. 2 is a diagram showing the line widths extracted from the individual measurements as a function of illumination wavelength.
Figure 3:
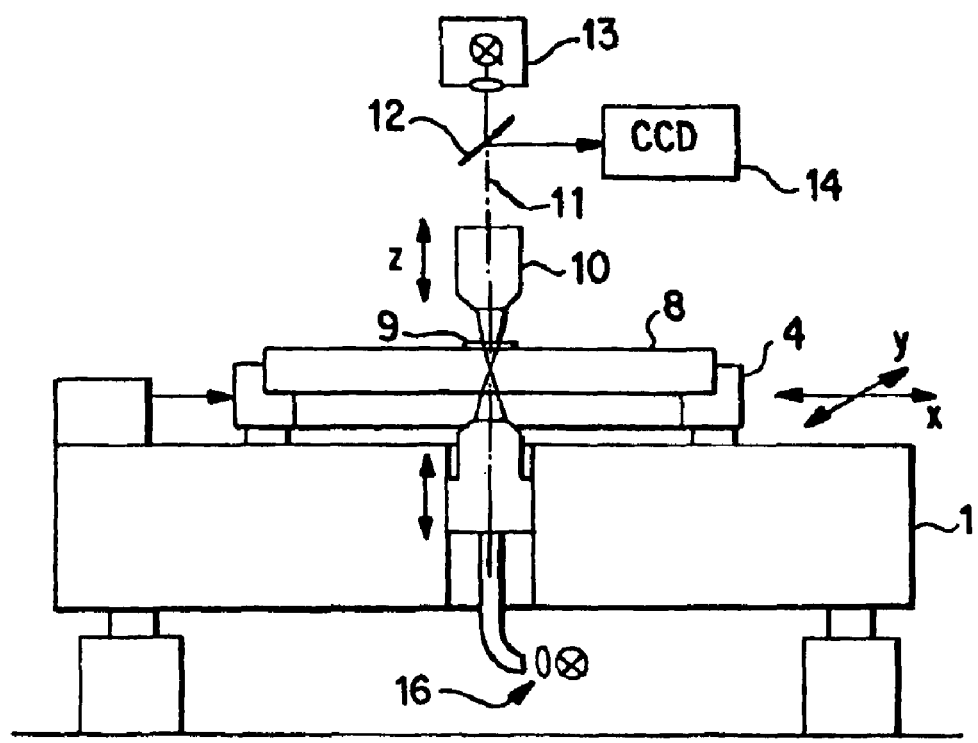
FIG. 3 is a block diagram of a known measuring instrument.

The method for detecting a specimen, in which two conductor paths extending in parallel fashion were detected and measured with a coordinate measuring instrument (see FIG. 3), is elucidated with reference to FIGS. 1 and 2.

According to the present invention, the semiconductor paths were detected with different resolutions of the microscopic imaging system or coordinate measuring instrument in each case. The image data thus obtained were conveyed to a statistical and numerical analysis operation.

During detection 14, the resolution capability of the microscopic imaging system was modified by varying the wavelength of the illuminating light 13. Light of the wavelengths 365 nm, 456 nm, 521 nm, 608 nm, and 730 nm was thus respectively filtered out of the light source of the semiconductor inspection microscope.

On the basis of the detected image data, characteristic parameters of the conductor paths was extracted. Thus in FIG. 1 the intensity distribution (a so-called profile) at a point on the two conductor paths transversely thereto is plotted as a function of position. In the measurement of conductor paths, the intensity profile along a straight line perpendicular to the conductor path is correspondingly extracted as a characteristic parameter.

The line width of the conductor paths is then determined on the basis of the profiles shown in FIG. 1. To do so, the individual edges of the conductor paths are calculated, the position of an edge being defined at that point where the 50% value is located in terms of the difference between maximum and minimum of the edge transition. As soon as the edge positions have been determined, the width of the respective conductor path is calculated from the difference between first edge and second edge.

FIG. 2 shows a diagram in which the measured line widths of the conductor paths, extracted from the intensity profiles of FIG. 1, are plotted as a function of the measured wavelength. Since the wavelength of the light is directly correlated with the resolution capability of the imaging system, the measured line width of the conductor paths is shown in FIG. 2 as, so to speak, a function of the resolution capability. An approximation function of the following form:

$$B(\lambda)=a\lambda+b+ce^{d\lambda}$$

was adapted to the extracted values.

For the adaptation, the values a, b, c, and d were determined in such a way that the approximation function gave as good a description as possible of the extracted values. In this context, $\lambda$ is the wavelength of the light used in each case.

Based on the approximation function ascertained in this fashion, the line width of the detected conductor paths can now be indicated in a region of the resolution capability of the semiconductor inspection microscope at which detection did not occur, for example at a wavelength of 670 nm. In addition, in particularly advantageous fashion, the line width of the conductor path can be indicated at a light wavelength and therefore at an imaging system resolution capability at which no measurement was ever accomplished or ever can be accomplished. The indication or determination of the corresponding line width of the conductor path is performed by means of an extrapolation of the approximation function.

The five solid symbols in FIG. 2 correspond to the extracted values of the width of the conductor paths. The three X symbols correspond to simulated values that were calculated with a detailed knowledge of the properties of the imaging system and with a knowledge of the specimen. These simulated values are plotted on the same diagram in order to check agreement between the method according to the present invention and microscopic imaging theory. The table below shows the wavelength of the simulation calculation and the error (corresponding to the distance of the simulated values from the approximation function in FIG. 2).

| $\lambda$ [nm] | Error [nm] |
|---|---|
| 304 | 0.12 |
| 228 | 0.35 |
| 183 | 0.54 |
| 0 | 2.13 |

With the method according to the present invention it is thus possible, in particularly advantageous fashion, to extrapolate to an "impossible" resolution, e.g. to detection with light at a wavelength of 0 nm, at which the error is approximately 2 nm.

In conclusion, be it noted very particularly that the exemplary embodiments discussed above serve merely to describe the teaching claimed, but do not limit it to the exemplary embodiments.

What is claimed is:

1. A method for highly accurately detecting a position of a structure on a specimen, the method comprising the acts of:

illuminating said specimen;

imaging the structure on the specimen onto a detector with an imaging system;

detecting repeatedly the structure with a different resolution of the imaging system in each case, thereby producing image data in each case; and performing at least one of a statistical and numerical analysis operation on the repeatedly detected image data to determine the position of the structure.

2. The method as defined in claim 1, wherein in order to vary the resolution capability of the imaging system, the wavelength of the illuminating light is modified.

3. The method as defined in claim 2, wherein the resolution capability of the imaging system is varied with an additional means for varying the resolution capability.

4. The method as defined in claim 3, wherein an aperture stop having a variable diameter is arranged in a beam path of the imaging system and serves as the additional means.

5. The method as defined in claim 1, wherein the resolution capability of the imaging system is varied with at least one means for varying the resolution capability.

6. The method as defined in claim 5, wherein an aperture stop having a variable diameter is arranged in a beam path of the imaging system and serves as the means for varying the resolution capability.

7. The method as defined in claim 1, wherein the resolution of the detected images is degraded with digital image processing methods.

8. The method according to claim 7, wherein the digital image processing methods are one of:

a combination of multiple pixels, a lowpass filtration of the image data, and a convolution of the image data with functions.

9. The method as defined in claim 1, wherein the structure is detected repeatedly with the imaging system set at one resolution capability.

10. The method as defined in claim 9, wherein the image data detected with the imaging system set at one resolution capability are subjected to a statistical analysis averaging operation.

11. The method as defined in claim 1, wherein characteristic parameters of the structure are extracted from the detected image data.

12. The method as defined in claim 11, wherein extracted as a characteristic parameter is at least one of:

one of a boundary and an area of the structure on the specimen; and an intensity profile along a curve through a detected structure on the specimen; and a localization of one of a structure on the specimen and a portion thereof.

13. The method as defined in claim 11, wherein extraction of the characteristic parameters is accomplished in the context of the image data that were detected with the resolution capability of the imaging system set differently in each case.

14. The method as defined in claim 13, wherein one of an interpolation and extrapolation of the values of the characteristic parameters to another resolution capability of the imaging system that was not set during detection is accomplished.

15. The method as defined in claim 14, wherein the values of the extracted characteristic parameters are conveyed to a numerical analysis operation as a function of the resolution capability of the imaging system that is set.

16. The method as defined in claim 15, wherein the one of the interpolation and extrapolation is performed on the basis of a function approximated to the values of the characteristic parameters.

17. The method as defined in claim 14, wherein the one of the interpolation and extrapolation is performed on the basis of a function approximated to the values of the characteristic parameters.

18. The method as defined in claim 11, wherein the values of the extracted characteristic parameters are conveyed to a numerical analysis operation as a function of the resolution capability of the imaging system that is set.

19. The method according to claim 1, wherein the position of the structure is detected using coordinates of the structure on the specimen.

20. The method according to claim 1, wherein the method detects a critical dimension of the structure on the specimen.

21. A microscope for highly accurately detecting a position of a structure on a specimen, comprising:

a light source that illuminates the structure on the specimen;

an imaging system that images the structure on the specimen;

a detector that detects the structure imaged thereon;

means for detecting the structure repeatedly with a different resolution of the imaging system in each case so as to produce image data in each case; and means for performing one of a statistical and a numerical analysis operation on the image data produced in each case to determine the position of the structure.

22. A microscope according to claim 21, wherein the microscope is a coordinate measuring instrument.

23. The method according to claim 21, wherein the microscope detects a critical dimension of the structure on the specimen.

* * * * *